United States Patent [19]
Darby

[11] Patent Number: 5,950,890
[45] Date of Patent: Sep. 14, 1999

[54] COMBINATION ROOF OR BED HEIGHT LOAD SUPPORT

[76] Inventor: Kenneth S. Darby, RR 1 Box 311, Falls, Pa. 18615

[21] Appl. No.: 09/158,667

[22] Filed: Sep. 22, 1998

[51] Int. Cl.[6] .................................................. B60R 9/00
[52] U.S. Cl. ..................... 224/402; 224/403; 224/485; 224/488; 224/495; 224/506; 224/519
[58] Field of Search ................................ 224/485, 488, 224/506, 518, 519, 402, 403, 520, 521, 495, 531, 532, 533, 534; 296/26, 3

[56] References Cited

U.S. PATENT DOCUMENTS

| | | |
|---|---|---|
| 5,451,088 | 9/1995 | Broad . |
| 5,454,496 | 10/1995 | Sumida et al. ........................... 224/509 |
| 5,458,389 | 10/1995 | Young . |
| 5,518,159 | 5/1996 | DeGuevara ............................ 224/488 |
| 5,560,666 | 10/1996 | Vieira et al. . |
| 5,649,656 | 7/1997 | Davy ...................................... 224/405 |
| 5,678,743 | 10/1997 | Johnson et al. ........................ 224/485 |
| 5,752,636 | 5/1998 | Manley ................................... 224/405 |
| 5,775,560 | 7/1998 | Zahn et al. .............................. 224/524 |

*Primary Examiner*—Allan N. Shoap
*Assistant Examiner*—Maerena W. Brevard

[57] ABSTRACT

A combination load support for use as a roof height carrier or pickup box extender that inserts into a standard receiver hitch. The device provides support for one end of ladders, canoes, etc. and the pickup cab or sport utility roof provides support for the other end. When one section of this combination load support is inserted in the opposite direction, long loads extending beyond the pickup truck's tailgate can be supported.

3 Claims, 2 Drawing Sheets

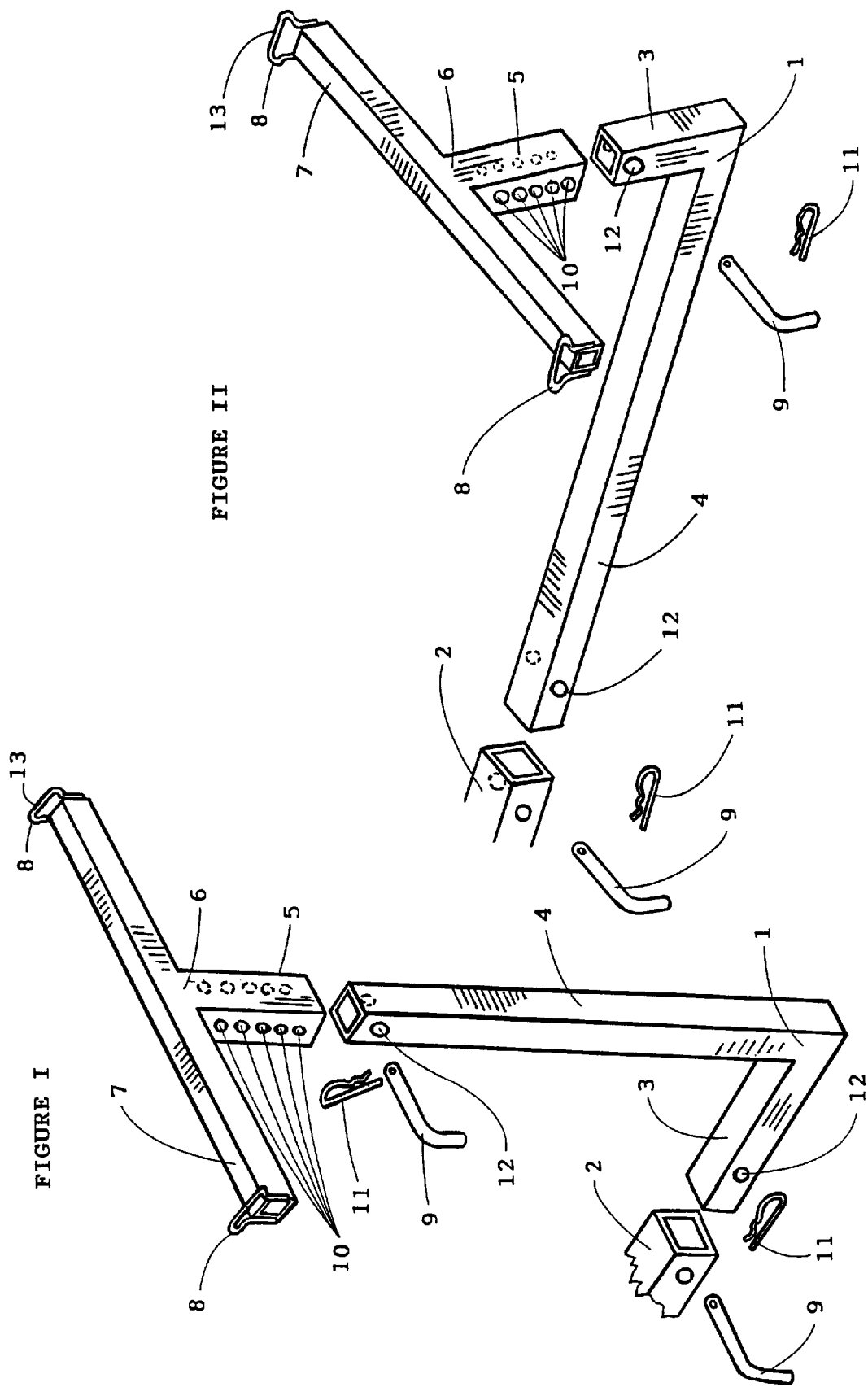

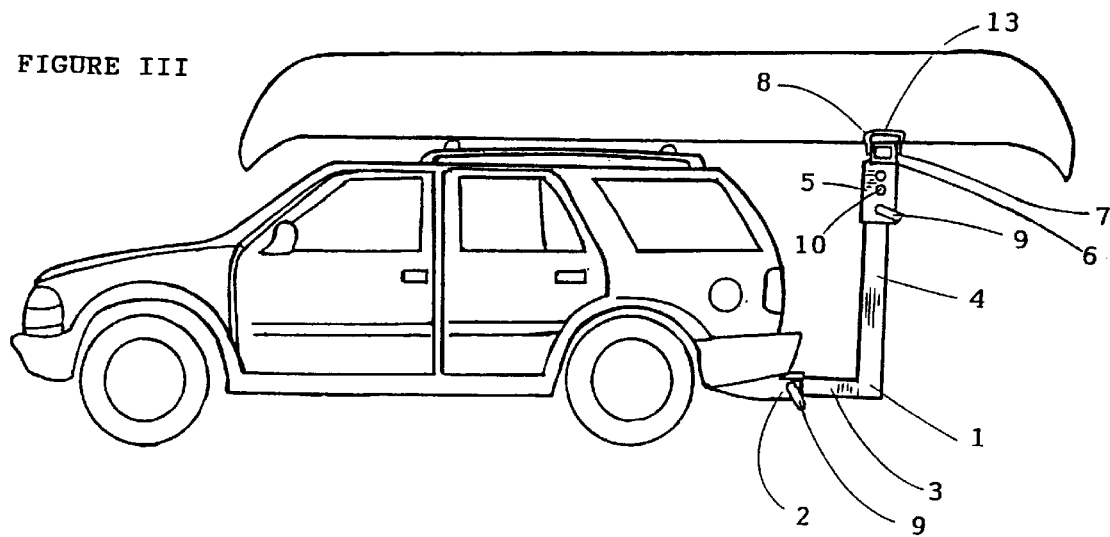
FIGURE III
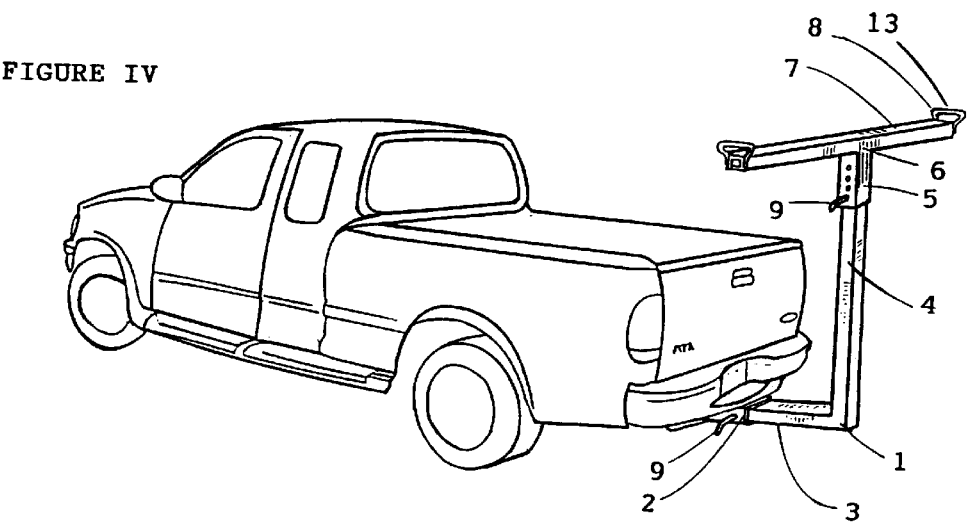
FIGURE IV
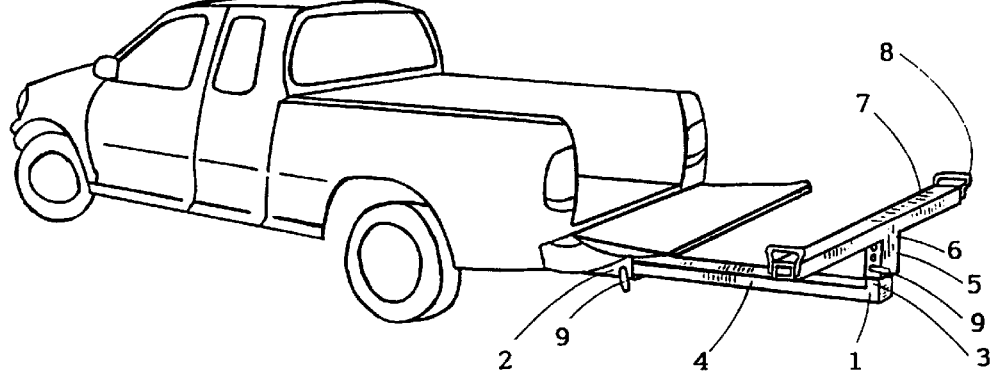
FIGURE V

COMBINATION ROOF OR BED HEIGHT LOAD SUPPORT

FIELD OF INVENTION

This invention relates to a combination load support that inserts into a receiver hitch and can either support items carried on top of a vehicle or items that extend beyond the pickup truck box.

BACKGROUND OF THE INVENTION

Many sport utilities have a rack on the roof for carrying various loads but often these racks are not strong enough to carry long loads such as a 17-foot canoe or long lumber. There is also a need to carry long items such as a ladder or canoe on top of a pickup truck while carrying other items in the pickup truck box. Many of the new pickup trucks have larger cabs and in turn a shorter pickup box for carrying loads. This present invention relates to a combination load support that solves both problems of carrying long loads on top of the roof or elongated loads that stretch out behind the pickup truck box.

Various units are available to do either one of these jobs but fail to do both roof top carrying and pickup box extending with one device. With a pickup truck it is often an advantage to carry a long item such as a ladder at the height of the cab roof so that other items and tools can be carried in the pickup truck box.

Prior racks such as Broad and Young insert into a receiver hitch and support a load extending beyond the bed of a truck. Neither will aid in supporting a load at the level of the roof. Broad has a pair of eyebolts, one on each end of the load rest. These eyebolts would work with a rope but not well with hold-down straps if the straps and their anchoring devices are too broad for the eyebolts.

Young had load holders extending vertically from each end of the horizontal support bar. They are welded and not adjustable with no means for fastening a rope or hold-down straps to secure the load. Young's load holders have a solid top which would not allow for easy tie down.

Vieira can support a load at the height of the roof but requires a separate unit to support a load extending from the bed of the truck. Vieira's two units are welded, are not adjustable, and are awkward to store.

It would be an advantage to the user if one apparatus could support loads on the roof of a pickup or a sport utility and also be adjusted to support loads extending beyond the tailgate of a pickup truck box.

This apparatus should be easy to assemble or disassemble and require only a small amount of storage space such as behind the seat of a pickup truck.

OBJECTS OF THE INVENTION

It is an object of the present invention to provide a load support for two different needs which prior to this invention required two separate load supports.

Another aspect of the present invention is to provide a device that is easily attached to and detached from the vehicle without the use of special tools and equipment.

This combination roof level load support and pickup box extender makes use of a standard receiver hitch.

Still another aspect of this invention is to supply a means to tie down the load being supported by this device using hold-down cleats that will not fray a rope or strap and are wide enough to accept even flat ends of ratchet tie-down straps.

It is a further object of this invention to provide a load support for roof level and bed level of both sport utility vehicles and pickup trucks and for said device to be adjustable to accommodate all models of both types of vehicles.

SUMMARY

An apparatus to be used as a load support having a combination of uses. One use is to support the back end of a long load at roof height where the front end is supported by the roof of the vehicle. The other use is to support a long load extending from the pickup truck box.

This load support apparatus consists of an "L"-shaped device that inserts into the receiver hitch of the vehicle and into the vertical tube projecting downward of the "T" bar which supports the load. When the short leg of the "L" section is inserted in the receiver hitch the long leg rises vertically high enough to support the "T" bar at roof height. When the long leg of the "L" section is inserted in the receiver hitch,the short leg of the "L" rises vertically enough to support the "T" bar at the level of the bed of a pickup truck. The "T" bar and the "L" section are held in place by a pin in one of several holes which allows a height adjustment to accommodate the needed height of various models of pickup trucks and sport utility vehicles.

The "T" bar section has a means to secure the load using hold-down cleats that are smooth, rounded and formed to provide a flat area to accommodate hold-down straps or a rope.

BRIEF DESCRIPTION OF THE DRAWING

FIG. I—Illustrates an exploded perspective view of the load support positioned to support roof height loads.

FIG. II—Illustrates an exploded perspective view of the load support positioned to support pickup truck bed height loads.

FIG. III—Illustrates a side view of a sport utility vehicle with the combination load support.

FIG. IV—Illustrates a perspective view of a pickup truck with a combination load support adjusted to the roof height.

FIG. V—Illustrates a perspective view of a pickup truck with the combination load support adjusted to the bed height.

REFERENCE TO NUMERALS IN DRAWINGS

1.—"L" section
2.—Insertion hitch
3.—Short leg
4.—Long leg
5.—Lower leg
6.—"T" Lower leg
7.—Horizontal support bar
8.—Tie down cleats
9.—Pin 13.
10.—Adjustment holes
11.—Pin keeper
12.—Holes
13.—Flat area

DETAILED DESCRIPTION OF THE DRAWING

FIG. I—Illustrates an exploded view with the "L" section (1) adjusted to provide roof height support. The "L" shaped section (1) has holes (12) drilled through both sides of the tubing at both ends of the "L" section (1). "L" section (1) has the long section of the "L" (4) vertical and the short leg of the "L" (3) horizontal.

Shown above the "L" section is the "T" support bar (6) having the lower leg (5) of the "T" constructed of larger tubing that will slip on the outside of either end of the "L" section (1) drilled with numerous holes (10) through both sides of the tubing to allow height adjustments. The "T" bar (6) has a horizontal support bar (7) with two tie-down cleats (8), one at each end. These tie-down cleats (8) are round to eliminate any fraying and are formed with a flat area (13) to accommodate hold-down straps with flat metal ends. The adjustment to proper height is accomplished by sliding the "T" (6) with holes (10) over the "L" (1) and inserting pin (9) when the holes line up for the desired height of the support bar (7). The keeper pin (11) holds pin (9) in place.

FIG. II—Illustrates the "L" shaped section of the load support (1) reversed so as the long leg (4) of the "L" section is horizontal and the short leg (3) is vertical. The lower portion (5) of "T" bar(6) can be slid around the end of the "L" section (1) as in FIG. I to now provide support for a load at a pickup truck bed height.

FIG. III—Illustrates a combination load support with the short leg (3) of the "L" section (1) inserted into the receiver hitch and the long leg (4) extending vertically and inserted into the bottom (5) of the "T" (6) with a horizontal support bar (7) and smooth tie-down cleats (8).

The "T" section (6) is adjustable up and down by inserting a pin (9) through adjustment holes (10) and the hole (12) of the "L" section (1). The "L" section (1) in the receiver hitch (2) is held in place by another pin (9). The pins (9) are retained in place by a keeper pin (11). The "L" section (1) has holes (12) drilled through both sides near each end. The "T" bar (6) has several holes (10) drilled through the sides of the lower leg (5) for height adjustment of the support bar.

FIG. IV—illustrates the use of this adjustable load support with the short leg (3) of "L" section (1) inserted in the insertion hitch (2) and the long leg (4) reaching vertically to support a roof height load on the "T' bar (6).

FIG. V—Illustrates the use of this adjustable load support with the long leg (4) of the "L" section (1) inserted in the hitch (2) and the short leg (3) of "L" (1) rising vertically to accept "T" bar (6) to support a load at the bed height of the pickup truck.

What I claim is:

1. A load support device for attachment to a receiver hitch of a vehicle, the device comprising an L-shaped member having a first part and a second part extending transverse to the first part, said first part being longer than the second part, said first part having a free end selectively attachable to the hitch receiver of the vehicle, said second part having a free end selectively attachable to the receiver hitch of the vehicle; and a support member for selective attachment to one of the free ends, said support member including a means for adjusting the height of the device and tie-down cleats secured thereto; wherein, in a first use, the free end of the first part is selectively attached to the receiver hitch and the support member is adjustably attached to the free end of the second part to support a load at a bed height of the vehicle and, in a second use, the free end of the second part is selectively attached to the receiver hitch and the support member is adjustably attached to the free end of the first part for supporting a load at a roof height of the vehicle.

2. The device in claim 1, said tie-down cleats further comprising rounded edges so as not to fray a rope or a strap and has a broad enough opening to accept flat straps with metal ends.

3. The device in claim 1, wherein said support member defines a T-shaped member with multiple holes on both sides of the lower side of the T-shape to allow a pin to be inserted through one side of the T-shaped support member, through both sides of the inserted L-shaped member, and out through the other side of the T-shaped support member securing the load support at the needed height.

* * * * *